United States Patent
Lee et al.

(10) Patent No.: US 7,242,842 B2
(45) Date of Patent: Jul. 10, 2007

(54) METHOD OF MANUFACTURING MULTI-CHANNEL OPTICAL ATTENUATOR

(75) Inventors: Sung Jun Lee, Seoul (KR); Jong Sam Kim, Kyungki-do (KR); Ro Woon Lee, Seoul (KR)

(73) Assignee: Samsung Electro-Mechanics Co., Ltd., Kyungki-Do (KR)

(*) Notice: Subject to any disclaimer, the term of this patent is extended or adjusted under 35 U.S.C. 154(b) by 291 days.

(21) Appl. No.: 10/949,325

(22) Filed: Sep. 27, 2004

(65) Prior Publication Data

US 2005/0115668 A1   Jun. 2, 2005

Related U.S. Application Data

(62) Division of application No. 10/791,696, filed on Mar. 4, 2004, now abandoned.

(30) Foreign Application Priority Data

Nov. 27, 2003   (KR) ............................... 2003-84942

(51) Int. Cl.
  *G02B 6/12* (2006.01)
  *G02B 6/02* (2006.01)
(52) U.S. Cl. ..................... 385/140; 385/14; 385/40
(58) Field of Classification Search ................ 385/140, 385/14, 40
  See application file for complete search history.

(56) References Cited

U.S. PATENT DOCUMENTS

| | | | |
|---|---|---|---|
| 5,204,921 A | | 4/1993 | Kanai et al. |
| 5,822,274 A | | 10/1998 | Haynie et al. |
| 5,991,493 A | | 11/1999 | Dawes et al. |
| 5,998,906 A | * | 12/1999 | Jerman et al. ............ 310/309 |
| 6,275,320 B1 | | 8/2001 | Dhuler et al. |
| 6,363,183 B1 | | 3/2002 | Koh |
| 6,377,718 B1 | * | 4/2002 | Que et al. ................. 385/3 |
| 6,506,313 B1 | * | 1/2003 | Fetterman et al. ......... 216/24 |
| 6,636,652 B1 | | 10/2003 | Kopelman et al. |

(Continued)

FOREIGN PATENT DOCUMENTS

| | | |
|---|---|---|
| DE | 33 30 059 A | 2/1985 |
| EP | 1 273 937 A | 1/2003 |
| JP | 09014911 A | 1/1997 |
| JP | 2002311343 A | 10/2002 |
| KR | 2003-72129 | 9/2003 |
| SU | 699654 A | 11/1979 |
| WO | WO 9739315 A1 | 10/1997 |

OTHER PUBLICATIONS

Cheng et al., "A Hermetic Glass-Silicon Package Formed Using Localized Aluminum/Silicon-Glass Bonding," Sep. 2001, Journal of Microelectromechanical systems, vol. 10, No. 3.

(Continued)

*Primary Examiner*—K. Cyrus Kianni
*Assistant Examiner*—Kianni Kaveh
(74) *Attorney, Agent, or Firm*—Lowe Hauptman & Berner

(57) ABSTRACT

In a method of manufacturing an optical attenuator, a bonding medium layer of polymer is used to bond an actuator structure and a support structure. A silicon layer is provided with waveguides for transmitting optical signals from an optical signal transmission line and an activator is formed at a predetermined portion thereof. The waveguides are inserted into cavities of the bonding medium layer. A support layer is attached to the bonding medium layer at an opposite face to a face where the bonding medium layer is bonded with a silicon substrate.

3 Claims, 3 Drawing Sheets

U.S. PATENT DOCUMENTS

| | | | |
|---|---|---|---|
| 6,674,159 | B1 | 1/2004 | Peterson et al. |
| 6,751,395 | B1* | 6/2004 | Novotny et al. ............. 385/140 |
| 6,785,004 | B2 | 8/2004 | Kersey et al. |
| 6,792,182 | B1 | 9/2004 | Davies et al. |
| 2002/0005976 | A1 | 1/2002 | Behin et al. |
| 2002/0034372 | A1* | 3/2002 | Alibert et al. ............... 385/147 |
| 2002/0074086 | A1 | 6/2002 | Nakamura et al. |
| 2003/0021551 | A1 | 1/2003 | Carpenter et al. |
| 2003/0035613 | A1* | 2/2003 | Huber et al. ................. 385/16 |
| 2003/0142939 | A1 | 7/2003 | Goroi et al. |
| 2003/0161576 | A1 | 8/2003 | Blair et al. |
| 2004/0057877 | A1 | 3/2004 | Rarbach et al. |
| 2004/0190111 | A1 | 9/2004 | Callies et al. |

OTHER PUBLICATIONS

A. Frisch; European Search Report; Munich, Germany; Sep. 2, 2004.

Patent Abstracts of Japan; vol. 2003, No. 02; Feb. 5, 2003 & Oct. 23, 2002; Fujitsu, Ltd.

Y. Jeong, et al.; Electrically Controllable Long-Period Liquid Crystal Fiber Gratings; IEEE Photonics Technology Letters; IEEE, Inc.; New York; vol. 12, No. 5; pp. 519-521; May 2000.

V.G. Chigrinov; Liquid Crystal Devices for Fiber Optical Applications; Proceedings of the SPIE; SPIE, Bellingham, Virgina, no date.

P. Mach, et al.; Optical devices based on tunable scattering material in air-silica microstructured fiber; Quantum electronics and Laser Science Conference; Quels, 2001; Postconference. Technical Digest; Baltimore, Maryland; May 6-11, 2001; Trends in Optics and Photonics; Washington D.C.; vol. 57; pp. 167-168; May 6, 2001.

P. Mach, et al.; Tunable Microfluidic Optical Fiber; Applied Physics Letters; American Institute of Physics; New York; vol. 80, No. 23, pp. 4294-4296; Jun. 10, 2002.

C. Kerbage, et al.; Tunable devices based on dynamic positioning of micro-fluids in micro-structured optical fiber; Optics Communications, North-Holland Publishing Co.; Amsterday, NL; vol. 204, No. 1-6, pp. 179-184; Apr. 1, 2002.

Patent Abstracts of Japan; vol. 1997, No. 05; May 30, 1997; Fuji Photo Optical Co., Ltd; Jan. 17, 1997.

* cited by examiner

METHOD OF MANUFACTURING MULTI-CHANNEL OPTICAL ATTENUATOR

RELATED APPLICATIONS

The present application is a divisional application of U.S. application Ser. No. 10/791,696, filed Mar. 4, 2004 now abandoned.

BACKGROUND OF THE INVENTION

1. Field of the Invention

The present invention relates to a multi-channel optical attenuator and manufacturing method thereof, and more particularly, to a multi-channel optical attenuator in which an actuator structure and a support structure are bonded to each other by a bonding medium in a Planar Lightwave Circuit (PLC) structured optical attenuator to control a light path using a waveguide, and a manufacturing method thereof.

2. Description of the Related Art

An optical attenuator, which is one of main parts in light transmission, is provided with an attenuating part. The attenuating part of the optical attenuator generates light loss of a predetermined amount and outputs an attenuated light signal through an output terminal. In light communication network, optical power received at a predetermined portion is different depending on the system's construction due to a difference in transmission loss of optical fiber according to the transmission distance, a difference in the number of connection points of optical fibers, optical coupling used in the transmission path, and the like. It is the optical attenuator to function to control the above factors.

The optical attenuator is configured to include an optical fiber part provided with an input terminal and an output terminal, and an attenuating part functioning to attenuate optical signals. Also, in case of a multi-channel structure, due to increase in device size and difficulty in fine alignment of optical fiber, there is sometimes used a structure where semiconductor device processing technologies are employed to fabricate a waveguide array of silica or the like and the respective waveguides are moved to adjust the optical transmission amount.

Optical attenuators are classified into fixed optical attenuator and variable optical attenuator according to the variation in the attenuated amount. Also, the variable optical attenuators can be classified into single channel VOA and multi-channel VOA according to the number of the input and output terminals.

FIG. 1 illustrates a structure of a PLC type multi-channel optical attenuator. Optical signal outputted from an optical fiber 110 of an input terminal passes through an optical attenuator 100 between the optical fiber 110 of the input terminal and an optical fiber 120 of an output terminal. The optical attenuator 100 is divided into a fixed waveguide part 130 connected to the optical fiber and a movable waveguide part 140 between the fixed waveguide parts 130. The movable waveguide 140 is arranged adjacent to an actuator 150 positioned at a side portion and is moved in a horizontal direction by the operation of the actuator 150, thereby adjusting the amount of optical signals transferred from the fixed waveguide 130. In FIG. 1, there is shown the multi-channel structure where a plurality of channels each being configured to include the optical fiber 110 of the input terminal, the optical fiber 120 of the output terminal, and the optical attenuator 100 arranged between the optical fibers 110 and 120.

To drive the optical attenuator shown in FIG. 1, there is essentially requested the actuator 150 arranged between the fixed waveguides 130, for moving the movable waveguide 140. Since silica forming the waveguide is formed on a silicon substrate, it is required to fabricate an actuator of a silicon structure. Also, to enable a precise etching and enable the operation of the actuator without any problem, it is necessary to form the thickness of the silicon membrane used as the actuator as thin as approximately 100 µm or less and to provide a support structure for supporting the actuator.

Accordingly, in case of the conventional art, as the support structure for supporting the silicon membrane, glass or silicon is generally used. This support structure of glass or silicon is bonded with the silicon membrane thereby to fabricate an optical attenuator including the actuator. Especially, since glass is transparent and has a relatively low junction temperature with silicon, it facilitates alignment of the waveguide and the actuator when being bonded with the silicon membrane. Thus, it is frequently used as the support structure.

FIGS. 2A to 2D illustrate a manufacturing method of an optical attenuator using glass as the support structure according to the conventional art (Steps a to d).

In FIG. 2A, optical waveguides 220 are formed on a silicon substrate 210. The optical waveguides 220 of a desired number of channels are arranged spaced apart by a predetermined interval from one another. (Step a)

In FIG. 2B, a support structure 230 for supporting the silicon substrate 210 on which the waveguides are formed is prepared. As the support structure 230, transparent glass is used as aforementioned. Cavities 240 where the optical waveguides 220 are inserted and positioned are formed in the support structure 230 of glass. (Step b)

In FIG. 2C, the silicon substrate 210 on which the optical waveguides are formed in the step a (as shown in FIG. 2A) is bonded to the support structure 230 such that the optical waveguides 220 are positioned in the cavities 240. The silicon substrate 210 is made into a thin membrane. (Step c)

In FIG. 2D, the bonded silicon substrate 210 is selectively etch-processed to form an actuator. (Step d)

Thus, in the conventional manufacturing method of the optical attenuator, the silicon substrate 210 is bonded to the support structure 230 of glass by an anodic bonding method in which high voltage and heat are applied. In this bonding process, heat of 400–500° C. is applied, which has an influence on the waveguides formed on the silicon substrate 210. Also, the bonding may be poor depending on the surface state of the bonding surfaces of the silicon substrate and the support structure.

In addition, in the conventional optical attenuator, the support structure has to use a special glass having the same heat expansion coefficient as silicon, which causes the increase of production costs and the difficulty in selecting material.

Further, the conventional method of manufacturing the optical attenuator uses isotropic etching process or sand blasting process to form the cavities in the support structure. However, the conventional manufacturing method makes it difficult to form the cavities having a precise size adapted for the size of the waveguides and it also needs a design to provide a sufficient margin between the channels upon considering the bonding area, which acts as great difficulties in integration and miniaturization of products.

SUMMARY OF THE INVENTION

Accordingly, the present invention has been devised to solve the aforementioned problems.

An object of the present invention is to provide a method for manufacturing an optical attenuator in which a bonding medium layer of polymer is formed between an actuator structure and a support structure, the actuator structure being formed from a silicon substrate provided with waveguides.

Another object of the present invention is to reduce heat applied when bonding a support structure so as to manufacture an optical attenuator, enhance the freedom in selecting materials used as the support structure, and enhance the integration and miniaturize the optical attenuator in a multi-channel arrangement.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical attenuator which adjusts transmission amount of an optical signal inputted through an optical signal transmission line and outputs the optical signal, comprising: a silicon layer provided with a waveguide for transmitting the optical signal from the optical signal transmission line and an activator formed at a predetermined portion thereof; a bonding medium layer provided with a cavity into which the waveguide is inserted, the bonding medium layer being bonded at a waveguide-formed face of the silicon layer; and a support layer attached to the bonding medium layer at an opposite face to a face where the bonding medium layer is bonded with a silicon substrate.

Preferably, the bonding medium layer is formed of a polymer having a high light transmission. More preferably, the bonding medium layer is formed of polydimethylsiloxane (PDMS).

Preferably, the support layer is made of glass. Also, the cavity into which the waveguide is inserted preferably has a width and a depth substantially same as those of the waveguide.

Preferably, the actuator formed in the silicon layer is a microelectromechanical system (MEMS) actuator which is movable in a horizontal direction depending on an application of a voltage. More preferably, the MEMS actuator is a comb type actuator.

In another aspect of the present invention, there is provided a method for manufacturing an optical attenuator, the method comprising the steps of: forming a photosensitive structure on an auxiliary substrate, the photosensitive structure having a size substantially same as that of a waveguide connected with an optical signal transmission line; forming a bonding medium layer on the auxiliary substrate so as to cover the photosensitive structure; separating the auxiliary substrate from the bonding medium layer to form a cavity in the bonding medium layer; attaching a support layer on an opposite face to a cavity-formed face of the separated bonding medium layer; preparing a silicon substrate provided at a predetermined surface thereof with a waveguide connected with the optical signal transmission line; bonding the silicon substrate and the bonding medium layer to each other such that the waveguide of the silicon substrate is inserted into the cavity of the bonding medium layer; and forming an actuator on the silicon substrate.

Preferably, the bonding medium layer is formed of a polymer having a high light transmission. More preferably, the bonding medium layer is formed of polydimethylsiloxane (PDMS).

Preferably, the support layer is made of glass. Also, the cavity into which the waveguide is inserted has a width and a depth substantially same as those of the waveguide.

Preferably, the actuator formed in the silicon layer is a microelectromechanical system (MEMS) actuator which is movable in a horizontal direction depending on an application of a voltage. More preferably, the MEMS actuator is a comb type actuator.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The manufacturing method of an optical attenuator according to the present invention is performed in the order of steps a to g in FIGS. 3A to 3G. In particular, a layered structure for supporting the waveguides will be described in more detail.

Figure 3A:
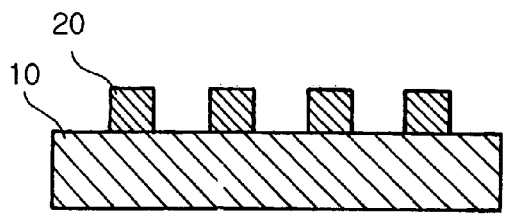
FIGS. 3A to 3G illustrate a manufacturing process of an optical attenuator according to the present invention.

FIGS. 3A to 3G illustrate a manufacturing process flow of an optical attenuator according to the present invention. First, as shown in FIG. 3A, a step of forming a photosensitive structure 20 having substantially the same size as waveguides connected with optical signal transmission lines on an auxiliary substrate 10 is carried out.

The auxiliary substrate 10 includes an arbitrary substrate on which silicon substrate or photosensitive pattern can be formed. The photosensitive structures 20 are formed at the same size, number and interval as the waveguides arranged on the auxiliary substrate 10. The photosensitive structures 20 are formed by thickly coating photoresist film and patterning and exposing the coated photoresist film.

Figure 3D:
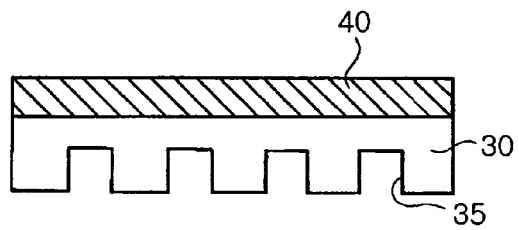
Figure 3B:
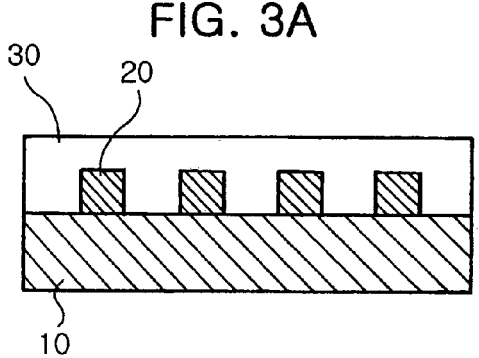

Next, as shown in FIG. 3B, a bonding medium layer 30 is formed on the auxiliary substrate 10 including the photosensitive structures 20 to cover the photosensitive structures 20. Preferably, the bonding medium layer 30 has a high light transmission property. The bonding medium layer 30 is formed by solidifying liquid polymer on the auxiliary substrate 10. As the polymer material, materials permitting covalent bond between silicon (Si) atoms and oxygen (O) atoms can be used. Also, the polymer material should be a material bondable to silicon or glass with a high light transmission property.

Accordingly, the bonding medium layer 30 preferably uses polydimethylsiloxane (PDMS) of liquid state. PDMS is a kind of silicon rubber and is polymer permitting covalent bond between silicon (Si) atoms and oxygen (O) atoms with a high light transmission property.

Figure 3E:
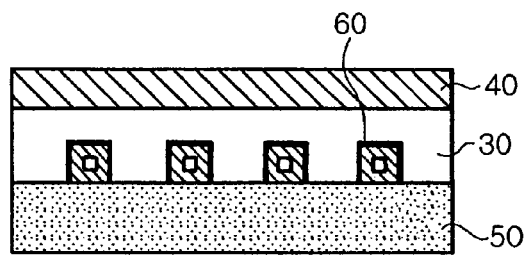
Figure 3C:
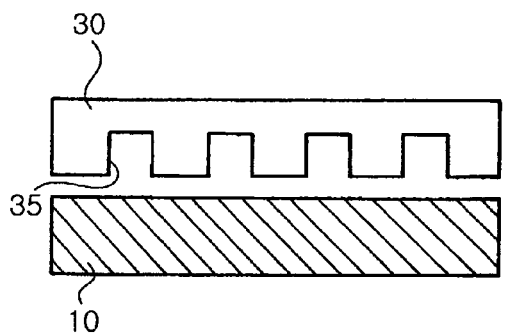

After solidifying the liquid PDMS 30 formed on the auxiliary substrate 10 to cover the photosensitive structures 20, the auxiliary substrate 10 is separated from the bonding medium layer 30. AS the auxiliary substrate 10 is separated, the photosensitive structures 20 are also separated from the bonding medium layer 20 so that cavities 35 into which the waveguides can be inserted are formed 35 in the bonding medium layer 30 as shown in FIG. 3C.

Since the present invention forms the cavities as above, it has an advantage in that the integration of the waveguides is enhanced. In other words, in the conventional art in which glass is used as the support structures, isotropic etching process or sand blasting process is used to form the corresponding regions of the waveguides, which makes it difficult to implement precise cavities adapted for the size of the waveguides. Also, the conventional art needs a design in which a sufficient margin is given between the channels so as to secure a sufficient boding area between the cavities.

However, in the present invention, since the cavities are formed at substantially the same size as the size of the waveguides, it is advantageous to reduce unnecessary space and to decrease the interval between the channels while providing the same bonding area as in the conventional art. The above advantages of the present invention contribute to the miniaturization of the multi-channel optical attenuator and the improvement in the integration.

Next, a support layer 40 is attached on the bonding medium layer 30 where the cavities 35 are formed as shown in FIG. 3D. The support layer 40 is attached to an opposite surface to a face where the cavities 35 are formed, and is formed of glass material. Since the support layer 40 is formed of transparent glass material, it becomes easy to align the waveguides and the actuator. Owing to the same reason, the bonding medium layer 30 is also formed of material having excellent light transmission property.

Since the optical attenuator of the present invention employs the bonding medium layer 30, various glass materials can be selected unlike that of the conventional art. In the conventional case, since the silicon substrate is bonded with glass, it is required to use a glass material, for instance, pyrex glass, having the same heat expansion coefficient as silicon. However, in case of the present invention, the bonding medium layer is used, and PDMS used as the bonding medium layer and glass are bondable to each other without applying high temperature heat during the bonding process. Accordingly, various glass materials can be selected thereby to save the material costs to the total production costs.

At this time, it is necessary to bond the bonding medium layer of PDMS and the support layer of glass. First, surface of the PDMS is treated by using Tesla coil and is oxidized by silanol radical. The oxidized surface of the PDMS is contacted with glass and left along with the glass for four hours so that the oxidized surface of the PDMS is bonded with the glass. The above bonding process is only exemplarily proposed and any other bonding process can be also employed if providing an equivalent effect.

As above, after the support layer 40 is bonded to the bonding medium layer 30, the waveguides 60 are aligned to correspond to the cavities 35. For this purpose, the waveguides 60 are formed on a silicon substrate 50. The silicon substrate 50 uses a silicon (Si) wafer having a predetermined thickness. The waveguides 60 made of silica are prepared on this substrate 50. The waveguides 60 are formed by a predetermined number and at a predetermined interval depending on the number of channels and a design pitch. The silicon substrate 50 with the waveguides 60 thereon is bonded with the bonding medium layer 30 such that the waveguides 60 are inserted into the cavities of the bonding medium layer 30. In other words, the waveguides-formed surfaces of the silicon substrate 50 are bonded with the cavities-formed surfaces of the bonding medium layer 30 each other.

To bond the cavities-formed surfaces with the silicon substrate 50, the bonding medium layer of PDMS and the silicon substrate are surface-treated by using an inductively coupled plasma (ICP) equipment. After the surface treatment, the two materials are contacted with each other having irreversible bonding therebetween, as shown in FIG. 3E.

Since PDMS is used as the material of the bonding medium layer 30, a bonding process between glass and silicon substrate can be omitted. In other words, the conventional direct bonding between glass and silicon substrate has several limitations, such as application of heat with a relatively high temperature. However, the present invention uses PDMS as the material of the bonding medium layer, and both surfaces of the PDMS are respectively bonded with glass and silicon substrate. Thus, the inventive bonding process provides an advantage to enable the bonding through surface treatment of a short time period.

Figure 1:
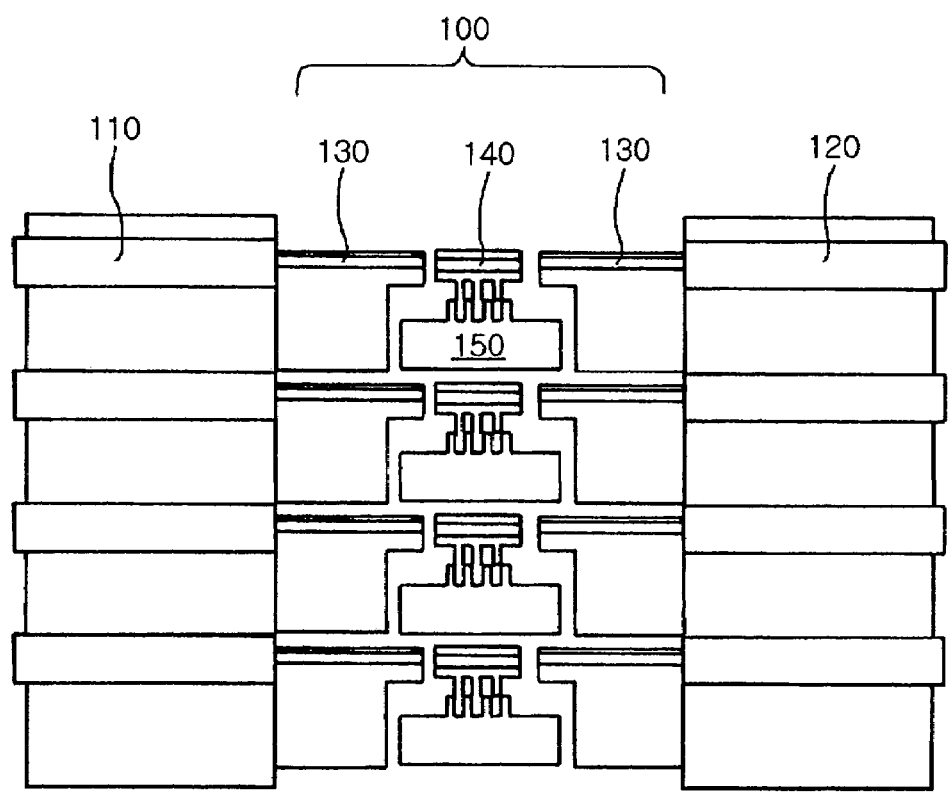
FIG. 1 illustrates a structure of a PLC type multi-channel optical attenuator.
Figure 2A:
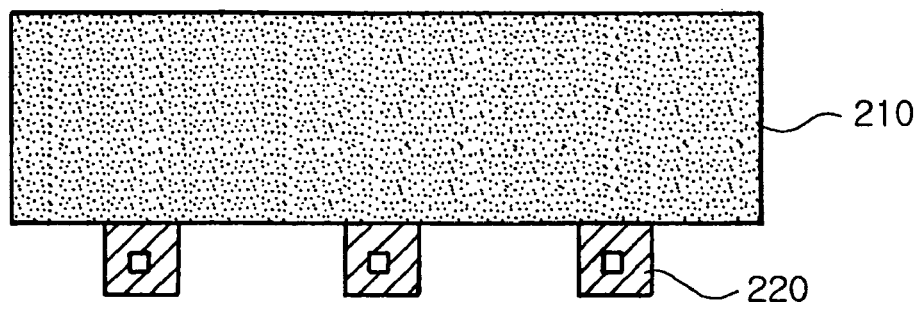
FIGS. 2A to 2D illustrate a manufacturing method of an optical attenuator using glass as the support structure according to the conventional art.
Figure 2B:
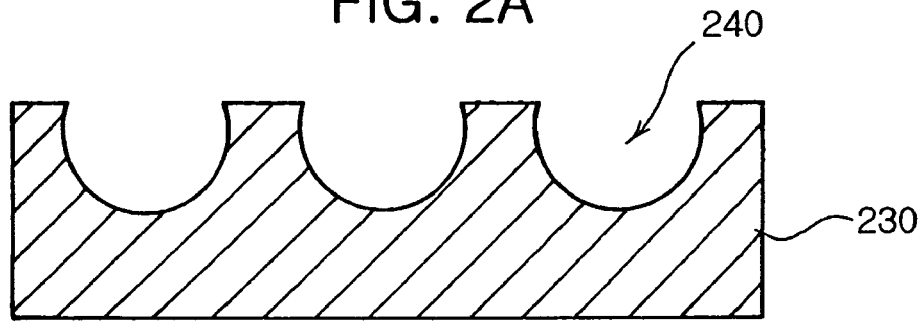
Figure 2C:
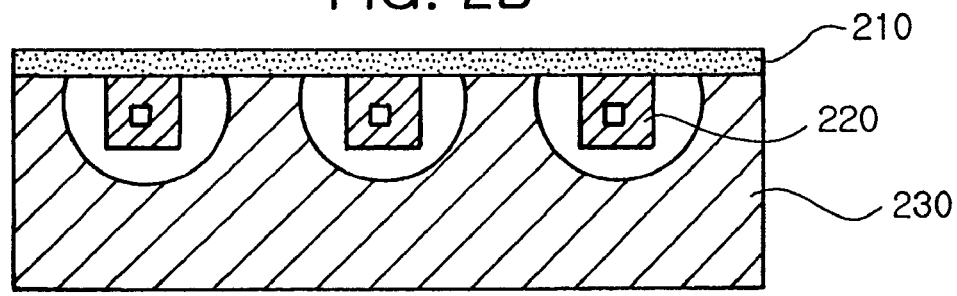
Figure 2D:
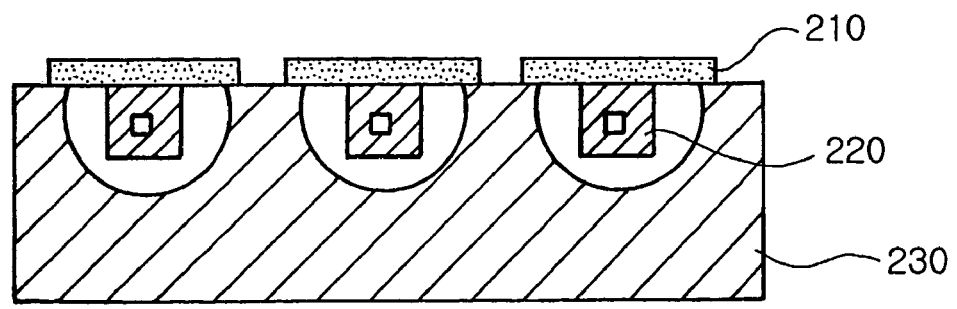
Figure 3F:
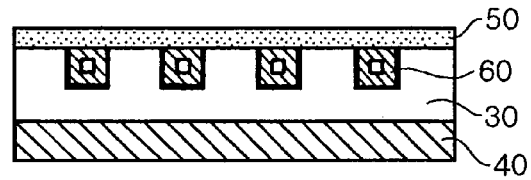
Figure 3G:
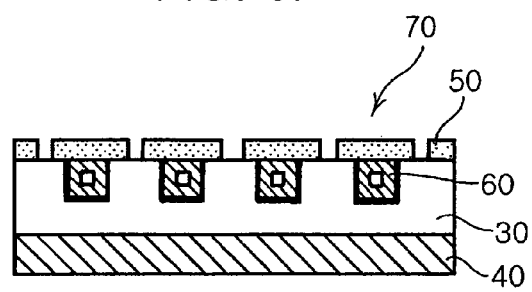

As above, after the silicon substrate 50 and the bonding medium layer 30 are bonded, the silicon substrate 50 is processed so as to form a driving part. In other words, the silicon substrate 50 is first processed thin, as shown in FIG. 3F. Then, a pattern layer is formed on the processed silicon surface and is processed to form a driving part 70, as shown in FIG. 3G. As the driving part 70, an actuator 150 is formed as shown in FIG. 1. The actuator 150 is preferably an MEMS actuator that is movable in a horizontal direction when a voltage is applied to. In particular, the actuator is more preferably a comb type actuator.

As described previously, a method for manufacturing an optical attenuator according to the present invention, employs the bonding medium layer formed of polymer between an actuator structure formed from the silicon substrate having waveguides thereon and a support structure. As a result, the flexibility of selecting materials for the support structure is increased, and an optical waveguide and manufacturing method thereof that enables enhancement of integrity and realization of miniaturization in a multi-channel configuration can be provided.

It will be apparent to those skilled in the art that various modifications and variations can be made in the present invention. Thus, it is intended that the present invention covers the modifications and variations thereof provided they come within the scope of the appended claims and their equivalents.

What is claimed is:

1. A method of manufacturing an optical attenuator, the method comprising the steps of:

forming a photosensitive structure on an auxiliary substrate, the photosensitive structure having a size substantially same as that of a waveguide to be connected with an optical signal transmission line;

forming a bonding medium layer on the auxiliary substrate so as to cover the photosensitive structure;

separating the auxiliary substrate from the bonding medium layer to form a cavity in one of opposite faces of the bonding medium layer;

attaching a support layer to the other of the opposite faces of the bonding medium layer;

preparing a silicon substrate provided at a predetermined surface thereof with the waveguide to be connected with the optical signal transmission line;

bonding the silicon substrate and the bonding medium layer to each other such that the waveguide of the silicon substrate is inserted into the cavity of the bonding medium layer; and processing the silicon substrate to form an actuator; wherein the bonding medium layer is formed of polydimethylsiloxane (PDMS).

2. A method of manufacturing an optical attenuator, the method comprising the steps of:

forming a photosensitive structure on an auxiliary substrate, the photosensitive structure having a size substantially same as that of a waveguide to be connected with an optical signal transmission line;

forming a bonding medium layer on the auxiliary substrate so as to cover the photosensitive structure;

separating the auxiliary substrate from the bonding medium layer to form a cavity in one of opposite faces of the bonding medium layer;

attaching a support layer to the other of the opposite faces of the bonding medium layer;

preparing a silicon substrate provided at a predetermined surface thereof with the waveguide to be connected with the optical signal transmission line;

bonding the silicon substrate and the bonding medium layer to each other such that the waveguide of the silicon substrate is inserted into the cavity of the bonding medium layer; and processing the silicon substrate to form an actuator;

wherein the cavity into which the waveguide is inserted has a width and a depth substantially same as those of the waveguide.

3. A method of manufacturing an optical attenuator, the method comprising the steps of:

forming a photosensitive structure on an auxiliary substrate, the photosensitive structure having a size substantially same as that of a waveguide to be connected with an optical signal transmission line;

forming a bonding medium layer on the auxiliary substrate so as to cover the photosensitive structure;

separating the auxiliary substrate from the bonding medium layer to form a cavity in one of opposite faces of the bonding medium layer;

attaching a support layer to the other of the opposite faces of the bonding medium layer;

preparing a silicon substrate provided at a predetermined surface thereof with the waveguide to be connected with the optical signal transmission line;

bonding the silicon substrate and the bonding medium layer to each other such that the waveguide of the silicon substrate is inserted into the cavity of the bonding medium layer; and processing the silicon substrate to form an actuator;

wherein the actuator is a microelectromechanical system (MEMS) actuator which is movable upon application of a voltage thereto; and the MEMS actuator is a comb type actuator.

* * * * *